US011362500B2

(12) United States Patent
Little et al.

(10) Patent No.: US 11,362,500 B2
(45) Date of Patent: Jun. 14, 2022

(54) MOUNTING DEVICE FOR AN ELONGATE FLEXIBLE MEMBER

(71) Applicant: FIRST SUBSEA LIMITED, Lancaster (GB)

(72) Inventors: Anthony John Little, Lancashire (GB); Craig Richard Thomson, Lancashire (GB); Stephen James Bennett, Lancashire (GB)

(73) Assignee: First Subsea Limited, Lancashire (GB)

( * ) Notice: Subject to any disclaimer, the term of this patent is extended or adjusted under 35 U.S.C. 154(b) by 0 days.

(21) Appl. No.: 16/962,123

(22) PCT Filed: Jan. 29, 2019

(86) PCT No.: PCT/GB2019/050235
§ 371 (c)(1),
(2) Date: Jul. 14, 2020

(87) PCT Pub. No.: WO2019/150088
PCT Pub. Date: Aug. 8, 2019

(65) Prior Publication Data
US 2020/0366074 A1 Nov. 19, 2020

(30) Foreign Application Priority Data
Jan. 30, 2018 (GB) ..................................... 1801497

(51) Int. Cl.
*F16L 3/00* (2006.01)
*H02G 3/22* (2006.01)
(Continued)

(52) U.S. Cl.
CPC ................. *H02G 3/22* (2013.01); *F16L 3/26* (2013.01); *F16L 5/00* (2013.01); *H02G 1/10* (2013.01);
(Continued)

(58) Field of Classification Search
None
See application file for complete search history.

(56) References Cited

U.S. PATENT DOCUMENTS 2,362,160 A * 11/1944 Robertson ................. F16L 5/00
248/56
2,913,260 A * 11/1959 Givens ...................... F16L 5/10
285/151.1
(Continued)

FOREIGN PATENT DOCUMENTS

GB 2543574 A 4/2017
WO 2016128739 A1 8/2016

OTHER PUBLICATIONS

International Search Report filed in PCT/GB2019/050235 dated Mar. 20, 2019; 2 pages.

*Primary Examiner* — Steven M Marsh
(74) *Attorney, Agent, or Firm* — Vedder Price P.C.

(57) ABSTRACT

A mounting device (110) for an elongate flexible member extending through an aperture (102), comprising: an elongate body (130) having a longitudinal axis; an internal passageway passing through the elongate body (130) parallel to the longitudinal axis, for receipt of the elongate flexible member; a plurality of apertures (132) in the elongate body (130); an engagement member (136) in each apertures (132) and constrained to move along a displacement axis inclined to the longitudinal axis of the elongate body (130); a plurality of actuation members (142), each engaged with a respective engagement member (136), whereby displacement of the actuation member (142) in a first direction displaces the engagement members (136) outwardly to project beyond the periphery of the elongate body (130) and displacement of the actuations members (142) in a second, opposite direction displaces the engage- (Continued)

ment members (136) inwardly; and biasing means (182) biasing the actuation members (142) in the first direction.

20 Claims, 5 Drawing Sheets

(51) Int. Cl.
  *F16L 3/26* (2006.01)
  *F16L 5/00* (2006.01)
  *H02G 1/10* (2006.01)
  *H02G 3/04* (2006.01)
  *H02G 9/02* (2006.01)
  *F03D 80/80* (2016.01)
  *E02B 17/00* (2006.01)

(52) U.S. Cl.
  CPC ............. *H02G 3/0481* (2013.01); *H02G 9/02* (2013.01); *E02B 17/00* (2013.01); *E02B 2017/0095* (2013.01); *F03D 80/85* (2016.05)

(56) References Cited

U.S. PATENT DOCUMENTS

| | | | | |
|---|---|---|---|---|
| 3,275,347 | A * | 9/1966 | William | F16L 19/10 285/139.3 |
| 6,189,407 | B1 * | 2/2001 | Champ | F16B 19/1081 248/49 |
| 6,978,973 | B1 * | 12/2005 | Gretz | F16L 3/1203 248/74.1 |
| 2004/0149480 | A1 * | 8/2004 | Ball | B60R 16/0215 174/77 R |
| 2006/0110217 | A1 * | 5/2006 | Foster | F16C 1/105 403/384 |
| 2020/0032593 | A1 * | 1/2020 | Serafinchan | E21B 17/1035 |

* cited by examiner

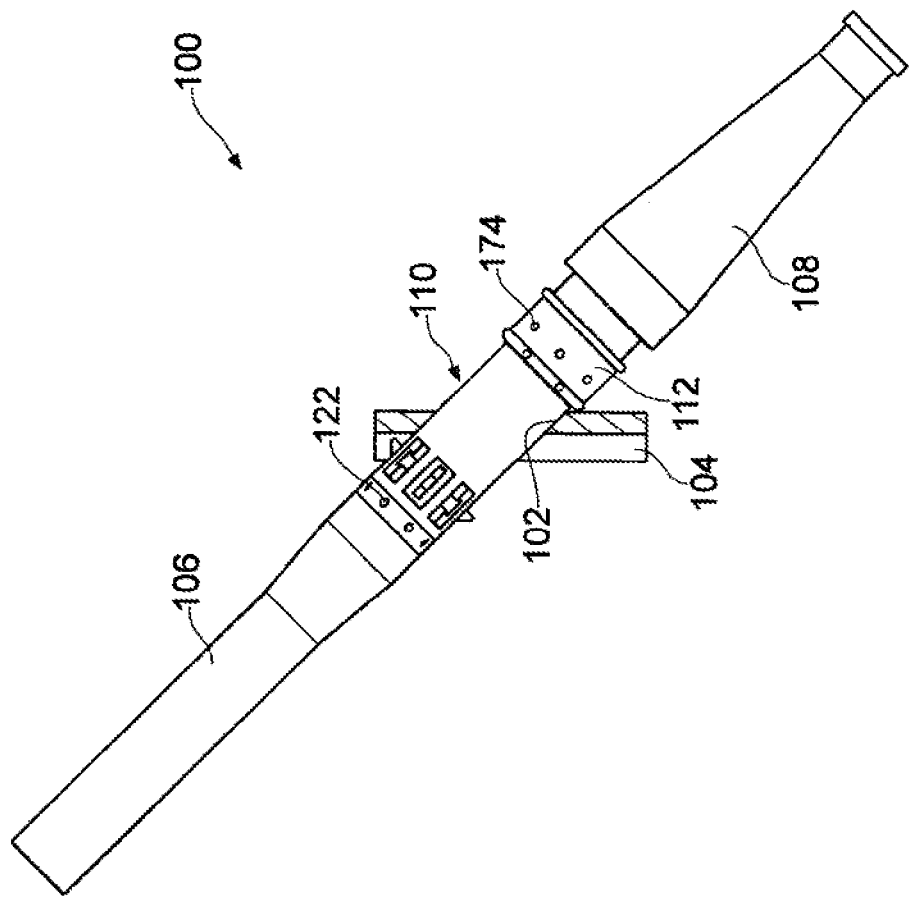
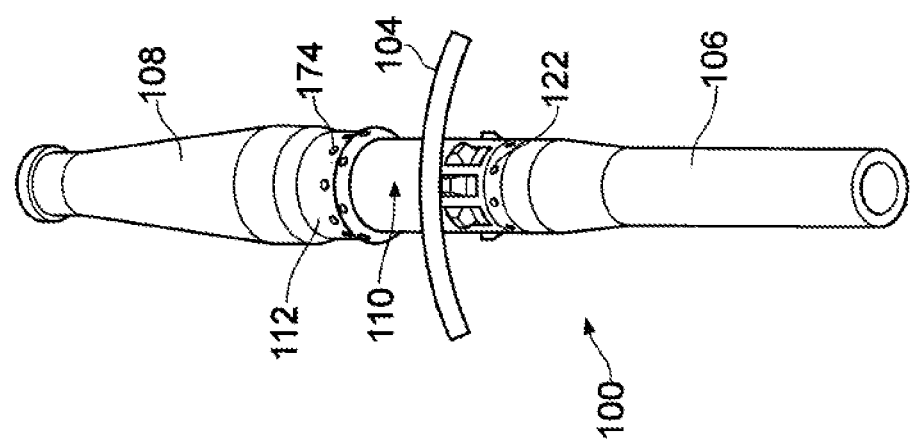
FIG. 1b
FIG. 1a

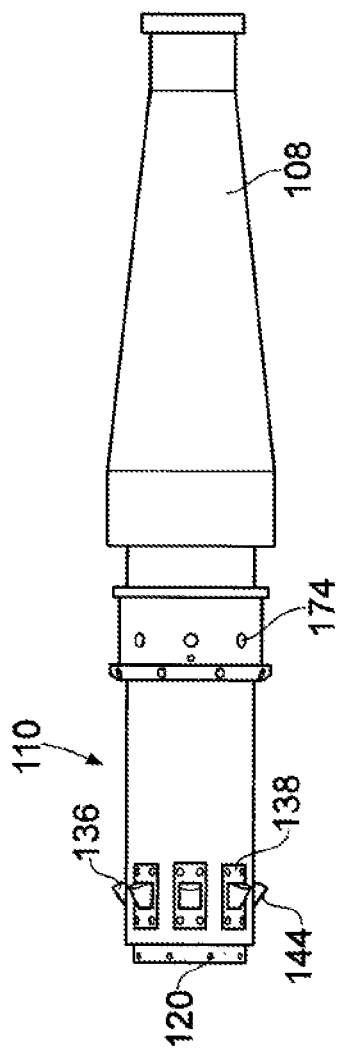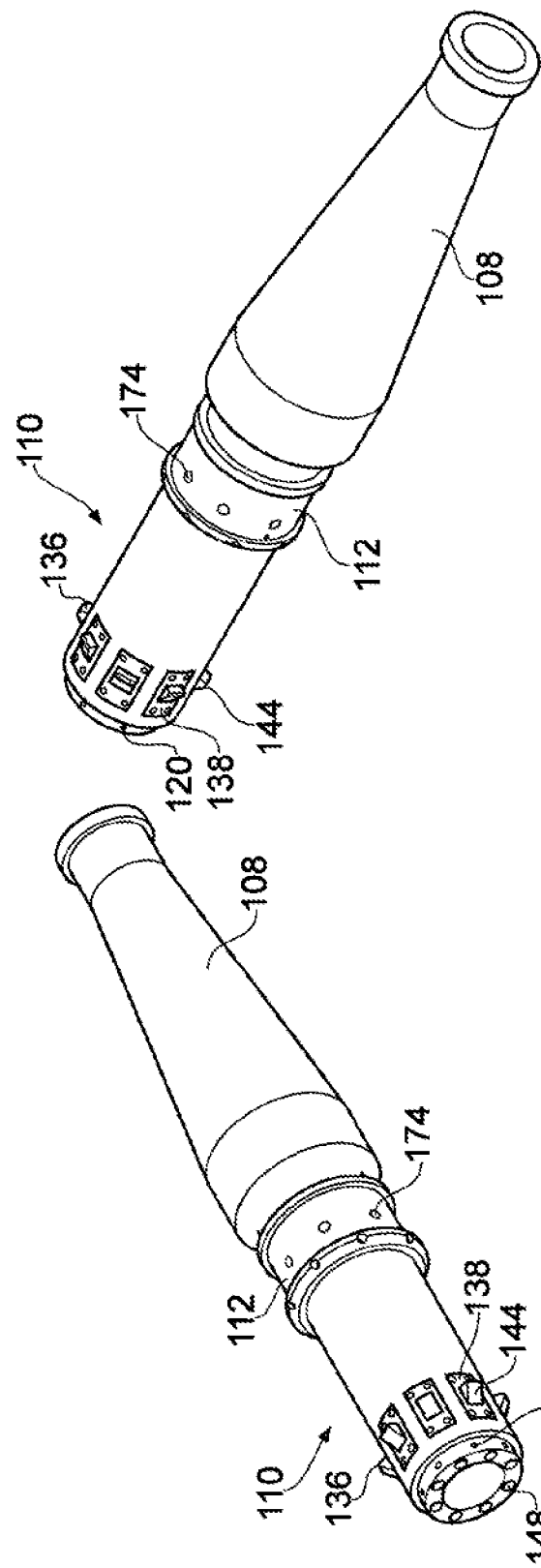

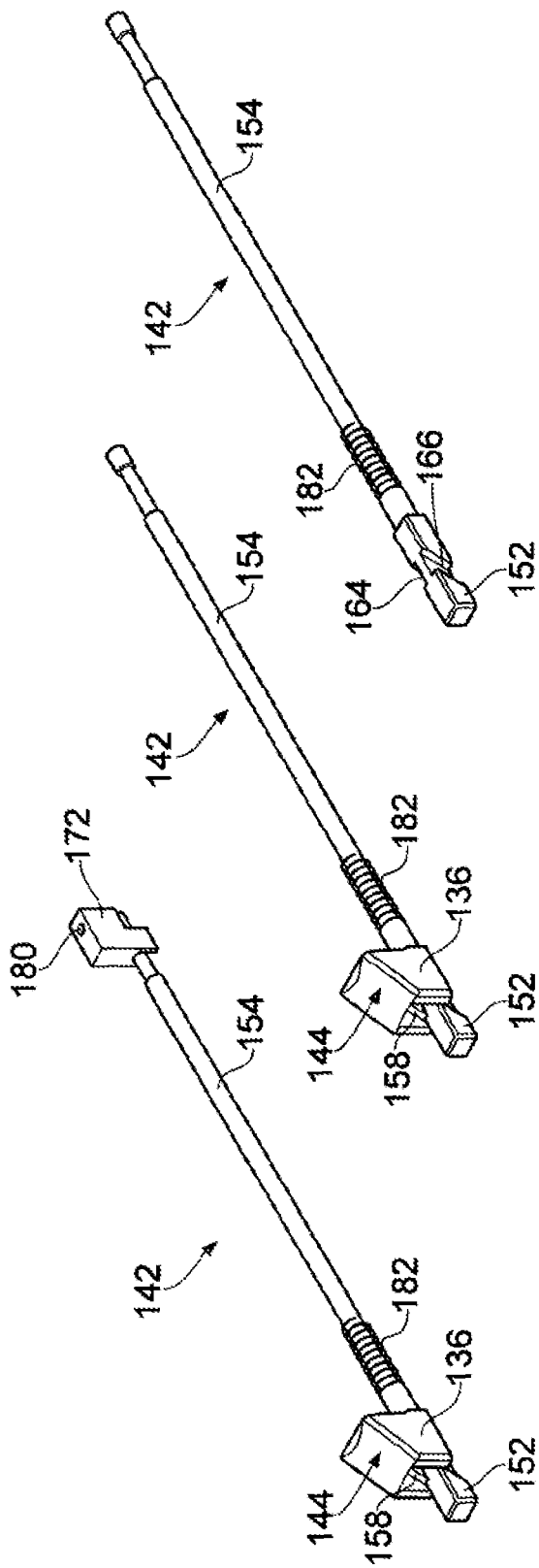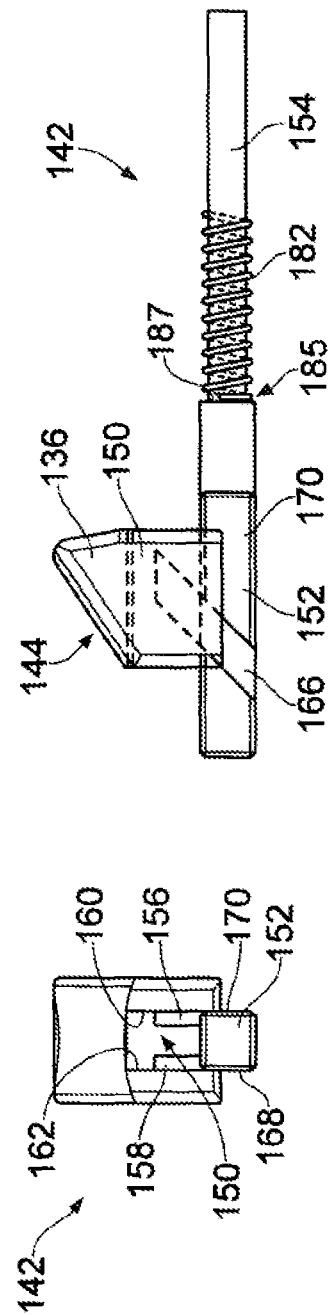

MOUNTING DEVICE FOR AN ELONGATE FLEXIBLE MEMBER

FIELD OF DISCLOSURE

The present invention relates to devices for mounting an elongate flexible member extending through an aperture, and to a protection device for an elongate flexible member comprising such a mounting device.

BACKGROUND OF DISCLOSURE

In offshore energy applications, it is normally necessary to secure an elongate flexible member, such as an electrical cable, to an offshore installation. This is normally achieved by securing one end of the elongate flexible member into a so-called J-tube or I-tube mounted on the structure.

However, there are some circumstances where the elongate flexible member must first pass through an aperture in a wall of the structure to which it is to be connected. A typical example of this would be where an electrical cable passes through the wall of a monopile mounted on the seabed, which forms the body of an offshore wind turbine. In such circumstances, it is necessary for the cable to be pulled through an aperture in the wall of the monopile without causing damage to the monopile or the cable itself.

It is an object of the present invention to provide a mounting device which allows an elongate flexible member to be pulled through an aperture, but which can be selectively and securely retained in position in the aperture.

SUMMARY OF DISCLOSURE

In accordance with the present invention, there is a mounting device for an elongate flexible member extending through an aperture, comprising:

A mounting device for an elongate flexible member extending through an aperture, comprising:
- an elongate body having a longitudinal axis;
- an internal passageway passing through the elongate body parallel to the longitudinal
- axis, for receipt of the elongate flexible member;
- a plurality of apertures in the elongate body;
- an engagement member in each aperture and constrained to move along a displacement axis inclined to the longitudinal axis of the elongate body;
- a plurality of actuation members, each engaged with a respective engagement member, whereby displacement of the actuation member in a first direction displaces the engagement members outwardly to project beyond the periphery of the elongate body and displacement of the actuations members in a second, opposite direction displaces the engagement members inwardly; and
- biasing means biasing the actuation members in the first direction.

When an elongate flexible member, such as a cable, is fitted with such a device, it can be pulled through the aperture in the wall of the structure to which it is to be mounted. The body of the device is designed to be slightly smaller than the aperture through which the cable passes, but the engagement members are designed to project from the outer peripheral face of the elongate body so that they engage the periphery of the aperture as the device is pulled through.

As the device is pulled through, the engagement members are displaced against the restoring force of the biasing means acting on the actuation members, which allows the device to be partially pulled through the aperture. However, when the force pulling the device through the aperture is removed, the biasing means biases the actuation members along the internal apertures, urging the engagement members outwardly so that they engage with the periphery of the aperture through which the device extends.

Consequently, the device is able to move forwardly through the aperture in one direction but is prevented from moving back out of the aperture in the opposite direction.

Preferably, the device comprises a plurality of elongate passages in each of which one of the actuation members is located.

In addition, it is preferred that the elongate passages are located parallel to the longitudinal axis of the elongate body.

Preferably, the longitudinal axis of the internal passageway is aligned with the longitudinal axis of the elongate body.

Preferably, the internal passageway is cylindrical.

It is also preferred that the outer peripheral face of the elongate body is cylindrical.

Preferably, the plurality of apertures are spaced around the elongate body at a first longitudinal position of the elongate body.

The device preferably comprises a plurality of recesses spaced around the elongate body at a second longitudinal position of the elongate body.

Preferably, the first plurality of apertures correspond circumferentially with respect to the plurality of recesses.

In addition, it is preferred that the elongate passages in which the actuation members are located extend between each aperture and corresponding recess.

Preferably, the device comprises a moveable tubular sleeve member on the exterior of the elongate body.

Preferably, the moveable tubular sleeve member conceals the second plurality of apertures.

It is also preferred that the movable tubular sleeve member be secured to the actuation means.

Preferably, the engagement member is constrained to move in the radial direction relative to the longitudinal axis.

It is also preferred that the engagement member is a locking dog.

Preferably, the biasing means is a spring.

Preferably the device comprises connecting means for connection to an elongate hollow protective device for passage of the elongate flexible member.

Preferably the device comprises connecting means at both ends of the elongate body, each connection to an elongate hollow protective device.

In addition, it is preferred that the device comprises connecting means for connection to a centraliser.

Preferably the device comprises connecting means for connection to a cable protection device.

In addition, it is preferred that the device comprises connecting means for connection to a bend stiffener.

BRIEF DESCRIPTION OF THE DRAWINGS

By way of example only, a specific embodiment of the present invention will now be described, with reference to the accompanying drawings, in which:

FIG. 1(a) is a perspective view of a portion of a cable protection assembly comprising centraliser, a cable protection device and a mounting device in accordance with the present invention, shown installed in a monopile of an offshore wind turbine;

FIG. 1(b) is a through section view of the cable protection assembly of FIG. 1(a);

FIGS. 2(a) to 2(c) are a side view, front perspective view and rear perspective view respectively of a mounting device and cable protection device which form part of the assembly of FIG. 1(a);

FIGS. 5(a) to (c) are perspective views of an actuation member in accordance with the present invention;

FIG. 5(d) is a front plan view of the actuation member of FIG. 5(a); and

FIG. 5(e) is a vertical cross-section through the actuation member of FIG. 5(a).

FIGS. 1(a) and 1(b) illustrate an embodiment of cable protection assembly 100 for a flexible electrical cable (not shown), secured in aperture 102 in the wall of a support pillar 104 of an offshore wind turbine. The cable is intended to be connected to the generator of a wind turbine and the cable protection assembly 100 encloses the electrical cable and both protects the cable from the underwater environment and prevents it from being bent to a radius which would damage the cable.

Figure 3A:
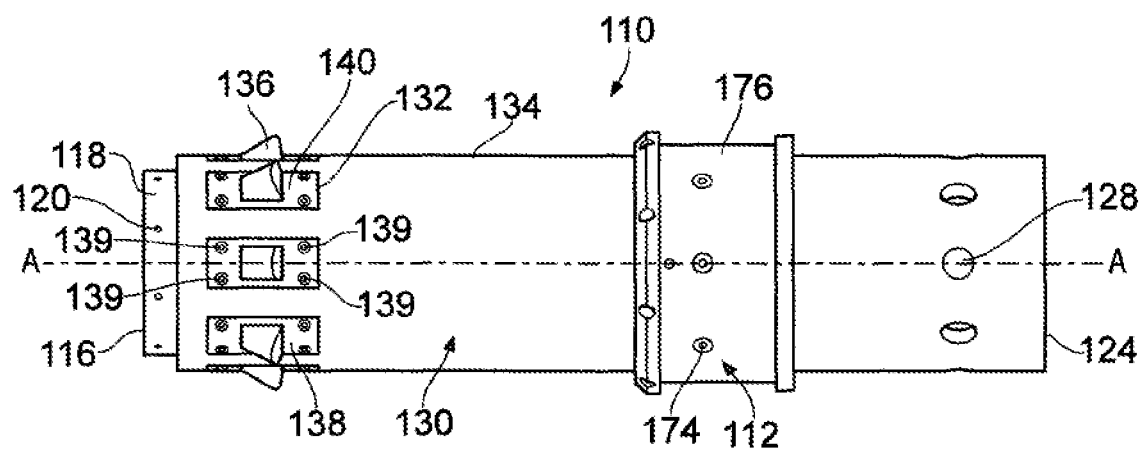
FIG. 3a is a plan view of the mounting device of FIG. 1(a)

The portion of the cable protection assembly 100 illustrated in FIGS. 1(a) to 1(b) comprises a centraliser 106 and a cable protection device 108, one end of each of which is secured to a respective end of a mounting device 110. The centraliser 106 and the cable protection device 108 are conventional and comprise tubular, flexible members formed from high density polyurethane. In the embodiment described and shown, the centraliser 106 and the cable protection device 108 are formed as bend stiffeners which are tapered towards the ends remote from the mounting device and are designed to allow a predetermined degree of flexibility but to prevent bending to such an extent that would result in damage to the cable passing through them.

It should be noted that further cable protection devices may be attached downstream of the cable protection device 108, to protect the enclosed electrical cable at locations further from the support pillar 104, for example, a series of interconnected bend restrictor elements and/or a series of flexible polyurethane tubes secured end-to-end. However, the additional cable protection devices do not form part of the present invention and will not be described further.

Figure 3B:
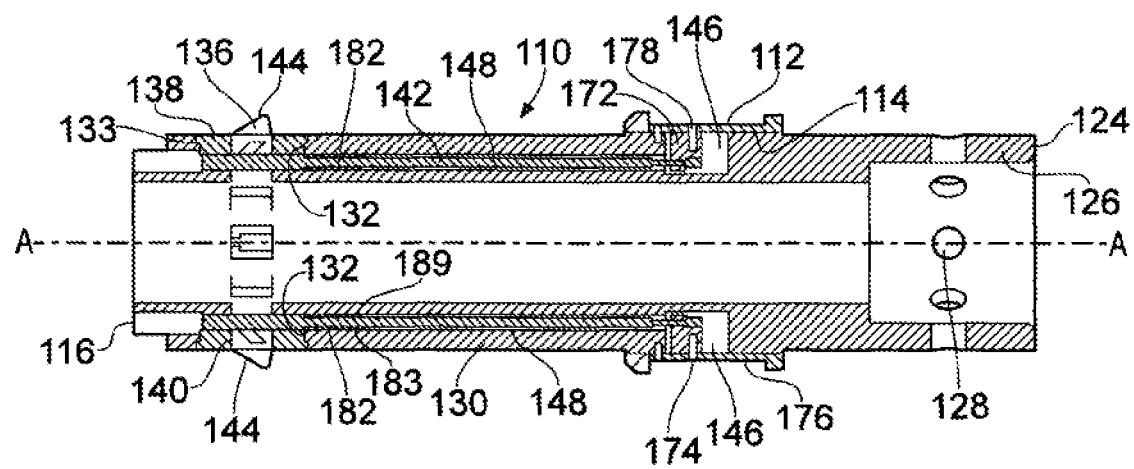
FIG. 3b is a vertical cross-section through the mounting device shown in FIG. 3(a)

As best seen in FIGS. 3a and 3b, the mounting device 110 comprises a cast iron elongate tubular body 130 and a tubular retractable sleeve 112 slidably mounted on the exterior of the elongate body 130. The tubular body 130 is provided with eight identical apertures 132 adjacent to a first end, equally angularly spaced around the peripheral exterior face 134 of the elongate body 130. The periphery of each aperture 132 is stepped, being provided with a peripheral shoulder 133, and each aperture receives a locking dog retaining cap 138, whose outer face is flush with the exterior face 134 of the elongate tubular body 130 and which is secured in place by means of four identical bolts 139.

Each retaining cap 138 comprises a through aperture 140 in which a locking dog 136 is slidably mounted and constrained to be displaced radially, i.e. perpendicularly to the longitudinal axis A-A of the elongate tubular body 130. Each locking dog 136 is engageable with one end of a respective elongate actuating member 142 and displacement of each actuating member 142 along its longitudinal axis displaces its associated locking dog 136 radially inwardly or outwardly, as will be explained.

The leading face 144 of each locking dog 136 is inclined relative to the longitudinal axis A-A of the mounting device 110 to facilitate insertion of the locking dog 136 into the aperture 102 in the wall of the support pillar 104. Actuation of the locking dog 136 will be described in more detail below.

The front end 116 of the mounting device 110 comprises a reduced diameter annular shoulder portion 118 extending parallel to the longitudinal axis A-A of the mounting device 110, for receipt in a complimentarily-shaped recess in one end of the centraliser 106. The annular shoulder portion 118 comprises eight identical recesses 120, spaced equally around the circumference of the annular shoulder portion 118, and extending perpendicularly to the longitudinal axis A-A of the mounting device 110. In use, each of the recesses 120 receives a securing bolt 122 which is threadedly received in a corresponding recess in the end of the centraliser 106 for securing the front end 116 of the mounting device 110 to the adjacent end of the centraliser 106.

The opposite, rear end 124 of the mounting device 110 is provided with an annular shoulder portion 126 extending parallel to the longitudinal axis A-A of the mounting device 110, for receipt in a complementarily-shaped recess in one end of the cable protection device 108. The annular shoulder portion 126 comprises eight identical apertures 128, spaced equally around the circumference of the annular shoulder portion 126, and extending perpendicular to the longitudinal axis A-A of the mounting device 110. In use, each of the apertures 128 receives a securing member (not shown) which is received in the end of the cable protection device 108 for securing the rear end 124 of the mounting device 110 to the adjacent end of the cable protection device 108.

Figures 4A, 4B:
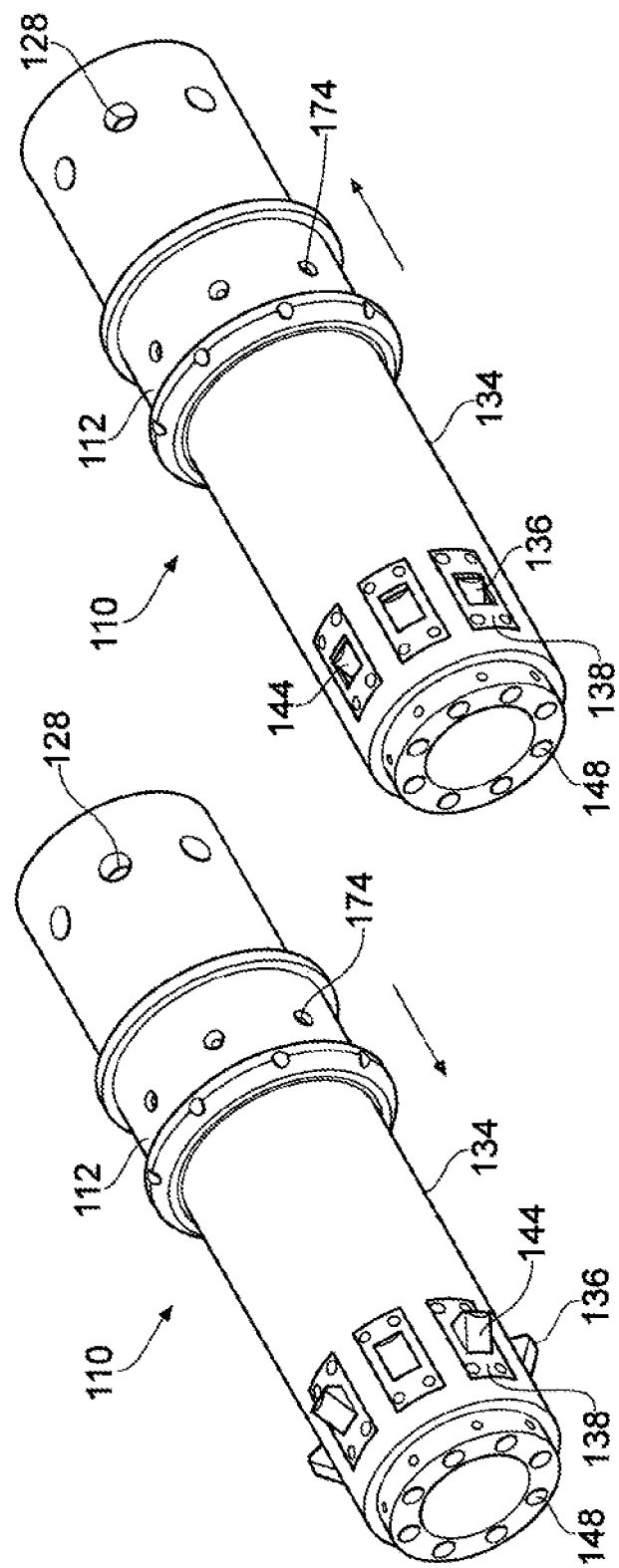
FIGS. 4(a) and 4(b) are perspective views of the mounting device of FIG. 3(a) shown in a condition in which locking dogs are in extended and retracted positions respectively.

As illustrated in FIG. 3b, the mounting device is also provided with eight identical, recesses 146 adjacent to a second end of the tubular body 130. The recesses 146 are spaced equiangularly around the peripheral face 134 of the mounting device 110, beneath the tubular retractable sleeve 112. Each of the recesses 146 corresponds to one of apertures 132 and are spaced circumferentially in line with one another. As best seen in FIGS. 3b, 4a and 4b, an internal passageway 148 is formed between each aperture 132 and its corresponding recess 146 and extends through the elongate body 130 of the mounting device 110 parallel to the axis A-A for receiving the actuation member 142. Each internal passageway 148 and corresponding actuation member 142 are dimensioned to allow movement of the actuation member 142 in a direction relative to the longitudinal axis A-A of the mounting device 110.

Referring to now FIGS. 5a, 5b and 5d, each locking dog 136 is provided with an elongate through recess 150 extending parallel to the longitudinal axis A-A of the mounting device 110 for receipt of a coupling head 152 of the elongate actuation member 142. The actuation member 142 comprises the coupling head 152 having a square vertical cross-section and an elongate portion 154 having a circular vertical cross-section. The locking dog 136 is slidably mounted to the coupling head 152 of the actuating member 142 by way of two identical, elongate projections 156, 158 formed on the opposing, inner faces 160, 162 of the recess 150 and inclined with respect to the longitudinal axis of the mounting device 110. The elongate projections 156, 158 formed on the inner faces 160, 162 of the recess 150 are received in correspondingly shaped grooves 164, 164 formed on opposing sides 168, 170 of the coupling head 152 of the actuating member 142. The elongate, inclined grooves 164, 166 receive the correspondingly shaped elongate, inclined projections 156, 158 to form an interlocking ramp mechanism, whereby movement of the actuation member 142 in a direction parallel to the longitudinal axis A-A causes the locking dogs 136, constrained by the retaining caps 138, to move in the radial direction.

As best seen in FIGS. 3b and 5a, the elongate portion 154 of the actuation member 142 is provided with a coupling member 172 at one end. The coupling member 172 is mounted within the recess 146 of the mounting device 110 for securing the actuation member 142 to the tubular retractable sleeve 112. The tubular retractable sleeve 112 comprises eight identical recesses 174, spaced equally around its peripheral face 176, and extending perpendicularly to the longitudinal axis A-A of the mounting device 110. The eight identical recesses 174 are located at a first longitudinal point. In use, each of the recesses 174 receives a securing bolt 178 which is threadedly received in a corresponding recess 180 of the coupling member 172 for securing the actuation member 142 to the tubular retractable sleeve 112. The sleeve further comprises two identical recesses 175, spaced equally around its peripheral face 176 and located at a second longitudinal point. In use, each recess 175 receives a shear bolt 191 which is threadedly received in a corresponding recess 193 of the elongate tubular body 130 and which normally retain the sleeve in a retracted position (displaced to the right as seen in the Figures). This configuration allows the locking dogs 136 to be radially moveable between a retracted and extended position when desired by moving the tubular retractable sleeve 112 in a direction parallel to the axis A-A of the mounting device 110, which shears the bolts 191.

As illustrated in FIGS. 5a, 5b, 5c and 5e, the elongate portion 154 of the actuation member 142 is stepped along its length, providing a peripheral shoulder 185 for engagement with a first end of a heavy duty compression spring 182. Similarly, as best seen in FIG. 3b, the internal passageway 148 is stepped along its length, being provided with a peripheral shoulder 183 for engagement with a second end of the heavy duty compression spring 182.

In use, the heavy duty compression spring 182 is positioned around the elongate portion 154 of the actuating member 142 between inner faces 187 and 189 formed by respective shoulders 185 and 183. As the actuating members are moved in the forward direction, the heavy duty compression springs 182 engage with the inner faces 187, 189 and are compressed, thereby biasing the actuation members 142 in the opposite direction. The coupling member 172 is provided with a through recess comprising a circular vertical cross-section which receives a stepped down portion 177 of the actuation member 154. The stepped down portion 177 is defined between two peripheral shoulder portions 181, 179 which engage opposing outer faces 183, 185 of the coupling member 172. In use, movement of the actuation member in a direction parallel to the axis A-A of the mounting device is constrained by the engagement of shoulder portions 181, 179 with the respective sides 183, 185 of the coupling member 172. This configuration allows the locking dogs 136 and corresponding actuations members 154 to move independently of the tubular retractable sleeve 112 and coupling member 172.

In use, the cable protection assembly 100 is loaded onto a cable-laying vessel and fitted around a cable to be protected and is discharged over the side of the vessel into the water towards a support pillar of a turbine. This is achieved in a conventional manner by means of a pulling line (not shown) extending from the support pillar 104 which is secured to the eye of a conventional connector member (not shown) which is embedded in the front end of the centraliser 106. The pulling line will also be connected to the end of the electrical cable to be laid and the connector member is provided with a weak link, designed to break on application of a predetermined tension, so that when the cable protection assembly 100 is retained in the aperture in the aperture 102 in the wall of a support pillar 104 of the wind turbine, further pulling of the pulling line will cause the connector member to fracture and will continue to pull the electrical cable through the cable protection assembly 100, as will be explained.

The pulling line pulls the cable protection assembly 100 and cable towards the aperture 102 in the wall of the support pillar 104. Eventually, the centraliser portion 106 will pass through the aperture 102, which assists in aligning the cable protection assembly 100 with the aperture 102. As the pulling line is pulled further, the body of the mounting device 110 enters the aperture 102. The outer diameter of the mounting device 110 is chosen to be slightly smaller than the diameter of the aperture 102, but the locking dogs 136 are designed so that the inclined leading face 144 of the locking dogs 136 engage with the boundary of the aperture 102 as the mounting device 110 passes through, such that the locking dogs 136 are forced to move to the retracted position, urging the actuating members 142 in the forward direction such that the heavy duty compression springs 182 bearing on the actuating members 142 are compressed. The locking dogs 136 thus retract inwardly against the force of the associated springs 182. However, any movement of the mounting device 110 in the opposite direction causes the compression springs 182 to bias the actuation members 142, urging the locking dogs 136 radially outwardly, so that the locking dogs 136 are urged strongly with engagement with the boundary of the aperture 102, whereby the mounting device 110 is effectively prevented from moving back out of the aperture 102 in the forward direction. The locking dogs 136 thus move radially outward.

However, movement of the mounting device 110 in the forward direction is still possible by moving the tubular retractable sleeve 112 in the forward direction (which results in shearing of the shear bolts 191), causing the actuation members 142 to move in the forward direction against the force of the associated springs 182 thereby urging the locking dogs 136 to move to the retracted position and out of engagement with the aperture 102 in which the mounting device 110 is located. In this way, the locking dogs 136 can be selectively retracted and extended. This allows the mounting device 110, the centraliser 106 and the cable protection device 108 connected to it, to be withdrawn from the aperture 102.

Although the mounting device 110 is intended to remain in place for extended periods of time, the provision of the retractable locking dogs 136 greatly facilitates removal of the mounting device 110, if it is ever required.

The present description is for illustrative purposes only and should not be construed to narrow the breadth of the present disclosure in an ṣ Nay. Thus, those skilled in the art will appreciate that various modifications might be made to the presently disclosed embodiment without departing from the full and fair scope of the present disclosure. For example the locking dogs 136 may be arranged within the mounting device 110 in a helical pattern.

Furthermore, the mounting device 110 is described as being made from solid cast iron. However, the mounting device may be made from different materials including, but not limited to, a truly alloyed stainless steel derived steel, such as stainless steel, Inconel® or Super Duplex stainless steel.

In addition, the centraliser 106 and the cable protection device 108 are described as bend stiffeners in the above embodiment. However, they need not be bend stiffeners. For example, the cable protection device 108 may instead comprise a bend restrictor, a rigid tube or an elongate rigid two-piece shell (e.g. Uraduct®).

Other aspects, features and advantages will be apparent upon an examination of the attached drawings and appended claims.

The invention claimed is:

1. A mounting device for an elongate flexible member extending through an aperture, comprising:
   an elongate body having a longitudinal axis;
   an internal passageway passing through the elongate body parallel to the longitudinal axis, for receipt of the elongate flexible member;
   a plurality of apertures in the elongate body; an engagement member in each aperture and constrained to move along a displacement axis inclined to the longitudinal axis of the elongate body;
   a plurality of actuation members,
   each engaged with a respective engagement member, whereby displacement of the actuation member in a first direction displaces the engagement members outwardly to project beyond the periphery of the elongate body and displacement of the actuations members in a second, opposite direction displaces the engagement members inwardly; and
   biasing means biasing the actuation members in the first direction.

2. The device as claimed in claim 1, comprising a plurality of elongate passages in each of which one of the actuation members is located.

3. The device as claimed in claim 2, wherein the elongate passages are located parallel to the longitudinal axis of the elongate body.

4. The device as claimed in claim 1, wherein the internal passageway is cylindrical.

5. The device as claimed in claim 1, wherein the outer peripheral face of the elongate body is cylindrical.

6. The device as claimed in claim 1, wherein the plurality of apertures are spaced around the elongate body at a first longitudinal position of the elongate body.

7. The device as claimed in claim 6, comprising a plurality of recesses spaced around the elongate body at a second longitudinal position of the elongate body.

8. The device as claimed in claim 7, wherein the plurality of apertures correspond circumferentially with respect to the plurality of recesses.

9. The device as claimed in claim 8, further comprising a plurality of elongate passages in each of which one of the actuation members is located wherein the elongate passages in which the actuation members are located extend between each aperture and corresponding recess.

10. The device as claimed in claim 1, comprising a moveable tubular sleeve member on the exterior of the elongate body.

11. The device as claimed in claim 7, wherein the moveable tubular sleeve member conceals the plurality of recesses.

12. The device as claimed in claim 10, wherein the movable tubular sleeve member is secured to the actuation members.

13. The device as claimed in claim 1, wherein the engagement member is constrained to move in the radial direction relative to the longitudinal axis.

14. The device as claimed in claim 1, wherein the engagement member is a locking dog.

15. The device as claimed in claim 1, wherein the biasing means is a spring.

16. The device as claimed in claim 1, comprising connecting means for connection to an elongate hollow protective device for passage of the elongate flexible member.

17. The device as claimed in claim 16, comprising connecting means at both ends of the elongate body, each connection to an elongate hollow protective device.

18. The device as claimed in claim 16, comprising connecting means for connection to a centraliser.

19. The device as claimed in claim 14, comprising connecting means for connection to a cable protection device.

20. The device as claimed in claim 14, comprising connecting means for connection to a bend stiffener.

* * * * *